US012381707B2

(12) United States Patent
Le et al.

(10) Patent No.: US 12,381,707 B2
(45) Date of Patent: Aug. 5, 2025

(54) DATA STREAM PROCESSING METHOD AND APPARATUS (71) Applicant: Huawei Technologies Co., Ltd., Shenzhen (CN)

(72) Inventors: Weijun Le, Dongguan (CN); Xiang He, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 411 days.

(21) Appl. No.: 17/831,123

(22) Filed: Jun. 2, 2022

(65) Prior Publication Data
US 2022/0294603 A1  Sep. 15, 2022

Related U.S. Application Data (63) Continuation of application No. PCT/CN2020/118875, filed on Sep. 29, 2020.

(30) Foreign Application Priority Data

Dec. 6, 2019  (CN) .......................... 201911243779.9

(51) Int. Cl.
H04L 7/00 (2006.01)
H04L 1/00 (2006.01)

(52) U.S. Cl.
CPC .......... H04L 7/0041 (2013.01); H04L 1/0041 (2013.01)

(58) Field of Classification Search
USPC .... 370/229, 230, 230.1, 231, 232, 235, 241, 370/252, 254, 255, 329, 336, 341, 358,
(Continued)

(56) References Cited

U.S. PATENT DOCUMENTS 8,385,374 B1  2/2013  Wohlgemuth
9,172,661 B1  10/2015  Dropps et al.
(Continued)

FOREIGN PATENT DOCUMENTS

CN  103916217 A  7/2014
CN  104579577 A  4/2015
(Continued)

OTHER PUBLICATIONS

Zhang Caochao, "The Design and and Verification of 100GE hysical Coding Sublayer," with an English translation, 2018, 38 pages.

Primary Examiner — Nguyen H Ngo
(74) Attorney, Agent, or Firm — Conley Rose, P.C.

(57) ABSTRACT

A method includes periodically inserting another AM into a data stream (DS) to obtain a second DS, and the first data stream includes a first alignment marker (AM); sending the second DS through physical lanes (PLs), where a quantity of the PLs is not equal to $2^n$, where the second AM's insertion period and each second AM's size is based on condition 1 or 2, where condition 1 is the quantity of the PLs, where condition 2 is condition 1 and a ratio of the second DS's rate to the first DS's rate, the second AM's insertion period and each second AM's size is an integer multiple of the quantity of the PLs, and where the second DS's rate is not less than the first DS's rate, and traffic per unit time corresponding to the rate of the second DS is an integer multiple of the quantity of the PLs.

11 Claims, 4 Drawing Sheets (58) Field of Classification Search
USPC .... 370/395.4, 436, 437, 464, 465, 468, 498, 370/508, 516, 535, 536, 542, 543
See application file for complete search history.

(56) References Cited

U.S. PATENT DOCUMENTS

| | | |
|---|---|---|
| 9,769,079 B1 | 9/2017 | Lo |
| 10,069,660 B1 | 9/2018 | Sun et al. |
| 10,476,791 B2* | 11/2019 | Zhong .................. H04L 43/028 |
| 2015/0120955 A1 | 4/2015 | Wang |
| 2016/0087753 A1 | 3/2016 | Ran et al. |
| 2018/0041332 A1* | 2/2018 | Yang ...................... H04L 7/048 |
| 2018/0338063 A1 | 11/2018 | O'Neill et al. |
| 2019/0028574 A1 | 1/2019 | Sun |
| 2022/0070556 A1* | 3/2022 | Lee ...................... H04L 1/0061 |
| 2022/0294603 A1 | 9/2022 | Le et al. |

FOREIGN PATENT DOCUMENTS

| | | |
|---|---|---|
| CN | 106464427 A | 2/2017 |
| CN | 108965761 A | 12/2018 |
| CN | 110072163 A | 7/2019 |
| CN | 111162869 A | 5/2020 |
| EP | 3300276 A1 | 3/2018 |
| JP | 2007067599 A | 3/2007 |
| JP | 2011223454 A | 11/2011 |
| JP | 2019528641 A | 10/2019 |
| KR | 20130103685 A | 9/2013 |
| WO | 2014052972 A1 | 4/2014 |
| WO | 2014071640 A1 | 5/2014 |

\* cited by examiner

DATA STREAM PROCESSING METHOD AND APPARATUS

CROSS-REFERENCE TO RELATED APPLICATIONS

This application is a continuation application of International Patent Application No PCT/CN2020/118875, filed on Sep. 29, 2020, which claims priority to Chinese Patent Application No. 201911243779.9, filed on Dec. 6, 2019. The disclosures of the aforementioned applications are hereby incorporated by reference in their entireties.

TECHNICAL FIELD

This application relates to the communications field, and in particular, to a data stream processing method and apparatus.

BACKGROUND

A data stream can be transmitted through a plurality of physical lanes (PLs), to implement high-speed transmission of the data stream on an Ethernet interface. A transmit end may convert one data stream into a plurality of data sub-streams, and simultaneously send the plurality of data sub-streams to a receive end through a plurality of physical lanes. In a process in which the data stream is transmitted from the transmit end to the receive end, different delays may be generated for different physical lanes. As a result, time points at which the plurality of data sub-streams arrive at the receive end are different. Currently, a frequently-used manner is to insert an alignment marker (AM) into the data stream, so that the receive end can restore the plurality of data sub-streams to the data stream. In this way, the receive end can align the data sub-streams based on alignment markers in the plurality of data sub-streams, to restore the aligned data sub-streams to the data stream.

However, this manner is applicable only to a case in which a quantity of physical lanes is $2^n$ (n is a positive integer). If the quantity of physical lanes is not $2^n$, the receive end cannot restore the data stream by using the foregoing method.

SUMMARY

Embodiments of this application provide a data stream processing method and apparatus, so that a receive end can still restore a data stream when a quantity of physical lanes is not $2^n$.

According to a first aspect, an embodiment of this application provides a data stream processing method. The method may be applied to a first chip. The first chip may be an application-specific integrated circuit (ASIC), a field-programmable gate array (FPGA), a central processing unit (CPU) chip, a programmable logic device (PLD), or the like. This is not limited in this application. The method includes the following steps. First, a first chip obtains a first data stream, where the first data stream includes a first alignment marker. The first data stream is a data stream obtained in a conventional manner, and a period and a size of the first data stream each are $2^n$ times. Second, the first chip periodically inserts a second alignment marker into the first data stream to obtain a second data stream. Finally, the first chip sends the second data stream through a plurality of physical lanes, where a quantity of the plurality of physical lanes is not equal to $2^n$, and n is a positive integer. In this embodiment of this application, to send the first data stream through the non-$2^n$ physical lanes, an insertion period of the second alignment marker and a size of each second alignment marker are determined based on a first condition or a second condition, the first condition is the quantity of the plurality of physical lanes, and the second condition is the quantity of the plurality of physical lanes and a ratio of a rate of the second data stream to a rate of the first data stream. A common part of the first condition and the second condition is that the insertion period of the second alignment marker and the size of each second alignment marker each are an integer multiple of the quantity of the plurality of physical lanes. Therefore, the second alignment marker can be evenly allocated to all physical lanes. In this way, a receive end that receives the second data stream can align second data sub-streams based on the second alignment marker, to restore the first data stream based on the aligned second data sub-streams. Therefore, the quantity of the physical lanes is not limited to $2^n$ while ensuring that an insertion period and a size of the first alignment marker are not modified, so that transmission flexibility of the data stream is improved. In addition, the second condition further includes the ratio of the rate of the second data stream to the rate of the first data stream, the rate of the second data stream is greater than or equal to the rate of the first data stream, and traffic per unit time that corresponds to the rate of the second data stream is an integer multiple of the quantity of the physical lanes. This ensures that the entire second data stream can be evenly allocated to all the physical lanes while ensuring that the second alignment marker is evenly allocated to all the physical lanes, to send the data stream through non-$2^n$ physical lanes.

In this embodiment of this application, the second alignment marker may be inserted into the first data stream in two possible implementations.

In one possible implementation, the first chip first converts the first data stream into a plurality of first data sub-streams, and then inserts a second alignment sub-marker into each first data sub-stream. In an example, the second alignment marker includes a plurality of second alignment sub-markers, a quantity of the plurality of second alignment sub-markers is the quantity of the plurality of physical lanes, and a size of each second alignment sub-marker is a quantity m of data blocks, where m is a ratio of the size of the second alignment marker to the quantity of the plurality of physical lanes, and m is a positive integer. First, the first chip converts the first data stream into the plurality of first data sub-streams based on the quantity of the plurality of physical lanes, where each of the plurality of first data sub-streams corresponds to one physical lane. Then, the first chip periodically inserts a second alignment sub-marker into each first data sub-stream to obtain a plurality of second data sub-streams. Finally, the first chip sends the plurality of second data sub-streams through the plurality of physical lanes.

In the other implementation, the first chip first inserts the second alignment marker into the first data stream to obtain the second data stream, then converts the second data stream into a plurality of second data sub-streams, and distributes the plurality of second data sub-streams through the plurality of physical lanes.

In this embodiment of this application, a location of the second alignment marker may be associated with a location of the first alignment marker. In an example, the first chip may first determine an insertion location of the second alignment marker based on the location of the first alignment marker in the first data stream and a preset distance. Then, the first chip periodically inserts the second alignment marker into the first data stream based on the insertion location of the second alignment marker, where the insertion period of the second alignment marker is greater than or equal to a common multiple of an insertion period of the first alignment marker and the quantity of the plurality of physical lanes. If the location of the second alignment marker is associated with the location of the first alignment marker, the receive end may identify the location of the first alignment marker based on the location of the second alignment marker for subsequent processing. Alternatively, when the second data stream does not include the first alignment marker, the receive end may restore the first alignment marker based on the location of the second alignment marker, to restore the first data stream.

In this embodiment of this application, when the rate of the second data stream is greater than the rate of the first data stream, the method further includes the first chip inserts padding data into the first data stream, where the padding data is, for example, a random sequence. The padding data is inserted into the first data stream, so that traffic of the second data stream per unit time can be exactly divided by the quantity of the physical lanes, to implement distribution of the second data stream to the plurality of physical lanes. Optionally, the first chip may periodically insert the padding data into the first data stream, or may aperiodically insert the padding data into the first data stream. This is not limited in this embodiment of this application.

In this embodiment of this application, when the rate of the second data stream is equal to the rate of the first data stream, because the second alignment marker is inserted, the first alignment marker needs to be correspondingly deleted.

In a possible implementation, the first chip may delete the first alignment marker before inserting the second alignment marker. In an example, the first chip first deletes the first alignment marker from the first data stream to obtain a third data stream. Then, the first chip periodically inserts the second alignment marker into the third data stream to obtain the second data stream. Correspondingly, a product of the size of the second alignment marker and a period of the second alignment marker is equal to a product of a size of the first alignment marker and a period of the first alignment marker, to ensure that the rate of the second data stream is equal to the rate of the first data stream.

In another possible implementation, the first chip may first insert the second alignment marker, and then delete the first alignment marker. In an example, the first chip first deletes the first alignment marker from the second data stream to obtain a fourth data stream. Then, the first chip sends the fourth data stream through the plurality of physical lanes. Similarly, a product of the size of the second alignment marker and a period of the second alignment marker is equal to a product of a size of the first alignment marker and a period of the first alignment marker, to ensure that the rate of the second data stream is equal to the rate of the first data stream.

According to a second aspect, an embodiment of this application provides a data stream processing method. The method may be applied to a second chip. An implementation of the second chip is similar to that of the first chip. For details, refer to the foregoing descriptions. The details are not described herein again. The method may include the following steps. First, the second chip receives a plurality of second data sub-streams, where each of the plurality of second data sub-streams includes a second alignment sub-marker. Then, the second chip aligns the plurality of second data sub-streams based on the second alignment sub-markers in the plurality of second data sub-streams. Finally, the second chip converts the plurality of second data sub-streams into a first data stream, where the first data stream does not include the second alignment sub-markers. In this embodiment of this application, because the second alignment sub-markers are aligned in the plurality of second data sub-streams, the second data sub-streams can be aligned based on the second alignment sub-markers. In addition, neither a size nor a period of the second alignment sub-marker is $2^n$ times, which does not comply with an existing standard specification of an alignment marker in a data stream. Therefore, the second alignment sub-marker needs to be deleted, to restore the first data stream that complies with the standard specification.

In this embodiment of this application, the second chip may convert the plurality of second data sub-streams into the first data stream in two possible implementations.

In one possible implementation, the second chip may first delete the second alignment sub-markers from the plurality of second data sub-streams, and then obtain one data stream through combination. In an example, the second chip first deletes the second alignment sub-markers from the plurality of second data sub-streams to obtain a plurality of first data sub-streams. Then, the second chip combines the plurality of first data sub-streams into the first data stream.

In the other possible implementation, the second chip may first combine the second data sub-streams into one data stream, and then delete a second alignment marker from the data stream. In an example, the second chip first combines the plurality of second data sub-streams into a second data stream, and combines the second alignment sub-markers in the plurality of second data sub-streams into a second alignment marker. Then, the second chip deletes the second alignment marker from the second data stream to obtain the first data stream.

In this embodiment of this application, when the second data sub-stream further includes padding data, the second chip further needs to delete the padding data, to restore the standard first data stream. Similar to deleting the second alignment marker, the padding data may also be deleted in two implementations.

In one possible implementation, the second chip first deletes padding data from the plurality of second data sub-streams to obtain first data sub-streams. Then, the second chip combines the first data sub-streams into the first data stream.

If a location of the second alignment sub-marker is associated with a location of the padding data, the second chip deletes the padding data from the plurality of second data sub-streams based on locations of the second alignment sub-markers and a first preset location relationship. The first preset location relationship is a location relationship between the second alignment sub-marker and the padding data. The second chip can quickly locate the padding data in the foregoing manner, to delete the padding data.

In the other possible implementation, the second chip first combines the plurality of second data sub-streams into the second data stream, and then deletes the padding data from the second data stream to obtain the first data stream.

If a location of the second alignment sub-marker is associated with a location of the padding data, the second chip deletes the padding data from the plurality of second data streams based on a location of the second alignment marker and a second preset location relationship. The second preset location relationship is a location relationship between the second alignment marker and the padding data.

The second chip can quickly locate the padding data in the foregoing manner, to delete the padding data.

In this embodiment of this application, the second data sub-stream may not include the first alignment marker. In this case, the first alignment marker needs to be restored.

In a possible implementation, the second chip may first delete the second alignment sub-marker, and then restore the first alignment marker. In an example, the second chip deletes the second alignment sub-markers from the plurality of second data sub-streams, and inserts first alignment sub-markers into the second data sub-streams based on locations of the second alignment sub-markers and a third preset location relationship, to obtain the first data sub-streams. The third preset location relationship is a relationship between an insertion location of the first alignment sub-marker and a location of the second alignment sub-marker.

In another possible implementation, the second chip may first restore the first alignment marker, and then delete the second alignment sub-marker. In an example, the second chip deletes the second alignment marker from the second data stream, and inserts the first alignment marker into the second data stream based on a location of the second alignment marker and a fourth preset location relationship, to obtain the first data stream. The fourth preset location relationship is a relationship between an insertion location of the first alignment marker and a location of the second alignment marker.

According to a third aspect, an embodiment of this application provides a data stream processing apparatus. The apparatus is applied to a first chip. The apparatus includes an obtaining unit, an insertion unit, and a sending unit. The obtaining unit is configured to obtain a first data stream, where the first data stream includes a first alignment marker. The insertion unit is configured to periodically insert a second alignment marker into the first data stream to obtain a second data stream. The sending unit is configured to send the second data stream through a plurality of physical lanes, where a quantity of the plurality of physical lanes is not equal to $2^n$, and n is a positive integer. An insertion period of the second alignment marker and a size of each second alignment marker are determined based on a first condition or a second condition. The first condition is the quantity of the plurality of physical lanes, and the second condition is the quantity of the plurality of physical lanes and a ratio of a rate of the second data stream to a rate of the first data stream. The insertion period of the second alignment marker and the size of each second alignment marker each are an integer multiple of the quantity of the plurality of physical lanes. The rate of the second data stream is greater than or equal to the rate of the first data stream, and traffic per unit time that corresponds to the rate of the second data stream is an integer multiple of the quantity of the physical lanes.

Optionally, the second alignment marker includes a plurality of second alignment sub-markers, a quantity of the plurality of second alignment sub-markers is the quantity of the plurality of physical lanes, and a size of each second alignment sub-marker is a quantity m of data blocks, where m is a ratio of the size of the second alignment marker to the quantity of the plurality of physical lanes, and m is a positive integer. The insertion unit is configured to convert the first data stream into a plurality of first data sub-streams based on the quantity of the plurality of physical lanes, where each of the plurality of first data sub-streams corresponds to one physical lane; and periodically insert a second alignment sub-marker into each first data sub-stream to obtain a plurality of second data sub-streams. The sending unit is configured to send the plurality of second data sub-streams through the plurality of physical lanes.

Optionally, the apparatus further includes a determining unit. The determining unit is configured to determine an insertion location of the second alignment marker based on a location of the first alignment marker in the first data stream and a preset distance. The insertion unit is configured to periodically insert the second alignment marker into the first data stream based on the insertion location of the second alignment marker, where the insertion period of the second alignment marker is greater than or equal to a common multiple of an insertion period of the first alignment marker and the quantity of the plurality of physical lanes.

Optionally, when the rate of the second data stream is greater than the rate of the first data stream, the insertion unit is further configured to insert padding data into the first data stream.

Optionally, the insertion unit is configured to periodically insert the padding data into the first data stream.

Optionally, the padding data is a random sequence.

Optionally, when the rate of the second data stream is equal to the rate of the first data stream, the insertion unit is configured to delete the first alignment marker from the first data stream to obtain a third data stream; and periodically insert the second alignment marker into the third data stream to obtain the second data stream. A product of the size of the second alignment marker and a period of the second alignment marker is equal to a product of a size of the first alignment marker and a period of the first alignment marker.

Optionally, when the rate of the second data stream is equal to the rate of the first data stream, the sending unit is configured to delete the first alignment marker from the second data stream to obtain a fourth data stream, and send the fourth data stream through the plurality of physical lanes. A product of the size of the second alignment marker and a period of the second alignment marker is equal to a product of a size of the first alignment marker and a period of the first alignment marker.

According to a fourth aspect, an embodiment of this application provides a data stream processing apparatus. The apparatus is applied to a second chip. The apparatus includes a receiving unit, an alignment unit, and a conversion unit. The receiving unit is configured to receive a plurality of second data sub-streams, where each of the plurality of second data sub-streams includes a second alignment sub-marker. The alignment unit is configured to align the plurality of second data sub-streams based on the second alignment sub-markers in the plurality of second data sub-streams. The conversion unit is configured to convert the plurality of second data sub-streams into a first data stream, where the first data stream does not include the second alignment sub-markers.

Optionally, the conversion unit is configured to delete the second alignment sub-markers from the plurality of second data sub-streams to obtain a plurality of first data sub-streams; and combine the plurality of first data sub-streams into the first data stream.

Optionally, the conversion unit is configured to combine the plurality of second data sub-streams into a second data stream, and combine the second alignment sub-markers in the plurality of second data sub-streams into a second alignment marker; and delete the second alignment marker from the second data stream to obtain the first data stream.

Optionally, the second data sub-stream further includes padding data. The conversion unit is configured to delete padding data from the plurality of second data sub-streams to obtain first data sub-streams; and combine the first data sub-streams into the first data stream.

Optionally, the conversion unit is configured to delete the padding data from the plurality of second data sub-streams based on locations of the second alignment sub-markers and a first preset location relationship. The first preset location relationship is a location relationship between the second alignment sub-marker and the padding data.

Optionally, the second data sub-stream further includes padding data. The conversion unit is configured to combine the plurality of second data sub-streams into the second data stream, and delete padding data from the second data stream to obtain the first data stream.

Optionally, the deleting padding data from the second data stream includes deleting the padding data from the plurality of second data streams based on a location of the second alignment marker and a second preset location relationship. The second preset location relationship is a location relationship between the second alignment marker and the padding data.

Optionally, the deleting the second alignment sub-markers from the plurality of second data sub-streams to obtain first data sub-streams includes deleting the second alignment sub-markers from the plurality of second data sub-streams, and inserting first alignment sub-markers into the second data sub-streams based on locations of the second alignment sub-markers and a third preset location relationship, to obtain the first data sub-streams. The third preset location relationship is a relationship between an insertion location of the first alignment sub-marker and a location of the second alignment sub-marker.

Optionally, the deleting the second alignment marker from the second data stream to obtain the first data stream includes deleting the second alignment marker from the second data stream, and inserting a first alignment marker into the second data stream based on a location of the second alignment marker and a fourth preset location relationship, to obtain the first data stream. The fourth preset location relationship is a relationship between an insertion location of the first alignment marker and a location of the second alignment marker.

According to a fifth aspect, an embodiment of this application provides a computer-readable storage medium, including a computer program. When the computer program is run on a computer, the computer is enabled to perform the foregoing data stream processing method.

According to a sixth aspect, an embodiment of this application provides a network device, including the foregoing data stream processing apparatus applied to the first chip and/or the foregoing data stream processing apparatus applied to the second chip.

DESCRIPTION OF EMBODIMENTS

For ease of understanding, a data stream may be considered to include a plurality of consecutive data blocks, and a size of each data block is traffic of the data stream per unit time. For example, a size of one data block is 1 bit, 8 bits, or 10 bits. When the data stream is distributed to a physical lane, the data stream may be distributed in data blocks, or may be distributed in 1 bit.

Figure 1:
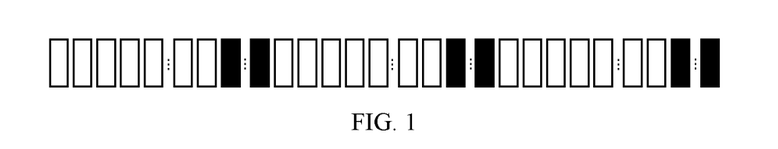
FIG. 1 is a schematic diagram of one data stream according to an embodiment of this application.
Figure 2:
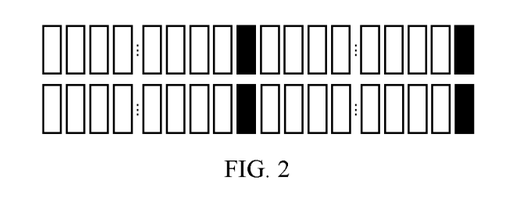
FIG. 2 is a schematic diagram of any two of 16 data sub-streams obtained by converting the data stream in FIG. 1 according to an embodiment of this application.

In a conventional manner, a size and a period of an alignment marker in a data stream are determined based on a quantity of physical lanes, that is, $2^n$. For example, when the quantity of physical lanes is 16, the period of the alignment marker is 16t (t is a positive integer). In other words, one alignment marker is inserted at an interval of 16t data blocks in the data stream. The size of each alignment marker is a quantity 16w (w is a positive integer) of data blocks (for ease of description, a size of an alignment marker that is mentioned below is expressed in a quantity of data blocks). FIG. 1 is a schematic diagram of one data stream. In the figure, white blocks represent data blocks in the data stream, and black blocks represent alignment markers. FIG. 2 is a schematic diagram of any two of 16 data sub-streams obtained by converting the data stream. It can be learned from FIG. 2 that, because a size of an alignment marker is a quantity 16w of data blocks, all alignment markers can be evenly allocated to all data sub-streams. In addition, because a period of the alignment marker is an integer multiple of a quantity of physical lanes, locations of the alignment markers in all the data sub-streams are the same. In an example, alignment markers of the two data sub-streams are aligned. When receiving the 16 data sub-streams shown in FIG. 2, a receive end may align the 16 data sub-streams based on the alignment markers in the 16 data sub-streams, to restore the data stream shown in FIG. 1.

However, if the quantity of physical lanes is not $2^n$, when the size and the period of the alignment marker each are still $2^n$, after the data stream is converted into a plurality of data sub-streams, alignment markers in the data sub-streams are not aligned. Therefore, after receiving the plurality of data sub-streams, the receive end cannot restore the original data stream based on the alignment markers.

Figure 3:
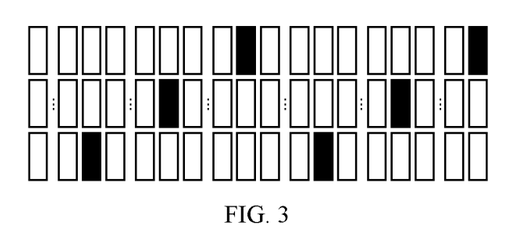
FIG. 3 is a schematic diagram of any three of 12 data sub-streams obtained by converting the data stream in FIG. 1 according to an embodiment of this application.

It is assumed that the quantity of physical lanes is 12, the period of the alignment marker still includes 16t (t is a positive integer) data blocks, and the size of the alignment marker is still 16w. In this case, after the data stream is converted into 12 data sub-streams, the alignment markers cannot be evenly allocated to all the data sub-streams, and locations of the alignment markers in all the data sub-streams are also different. FIG. 3 is a schematic diagram of three data sub-streams. It can be learned that alignment markers in the three data sub-streams are not aligned. Therefore, the receive end cannot restore the data stream in FIG. 1 based on the alignment markers in the three data sub-streams.

To resolve the technical problem, embodiments of this application provide a data stream processing method and apparatus, so that a receive end can still restore a data stream when a quantity of physical lanes is not $2^n$.

For ease of understanding, an application scenario in embodiments of this application is first described.

Figure 4:
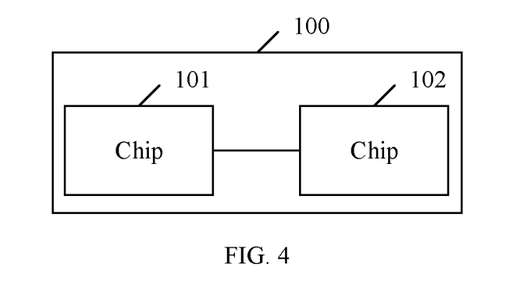
FIG. 4 is a schematic diagram of a network device 100 according to an embodiment of this application.

FIG. 4 is a schematic diagram of a network device 100. The network device 100 may be a router, a switch, or the like. The network device 100 includes a chip 101 and a chip 102. The chip 101 and the chip 102 may be connected through a backbone, a parallel bus, or the like.

The chip 101 includes at least one interface, and the at least one interface may be, for example, an Ethernet interface. Each interface may include a plurality of physical lanes, and the plurality of physical lanes are configured to send a data stream. Each physical lane may correspond to a serializer and a deserializer, and the serializer/deserializer is also referred to as a SerDes.

The chip 102 includes at least one interface, and the at least one interface may be, for example, an Ethernet interface. Each interface may include a plurality of physical lanes, and the plurality of physical lanes are configured to receive a data stream. Each physical lane may correspond to a pair of SerDes.

The chip 101 and the chip 102 each may be an ASIC, a FPGA, a CPU chip, a PLD, or the like. This is not limited in this application.

Certainly, it may be understood that the application scenario shown in FIG. 4 does not constitute a limitation on the technical solutions of this application. Persons skilled in the art may design an application scenario based on a specific situation. For example, the chip 101 and the chip 102 are distributed in different network devices.

Figure 5:
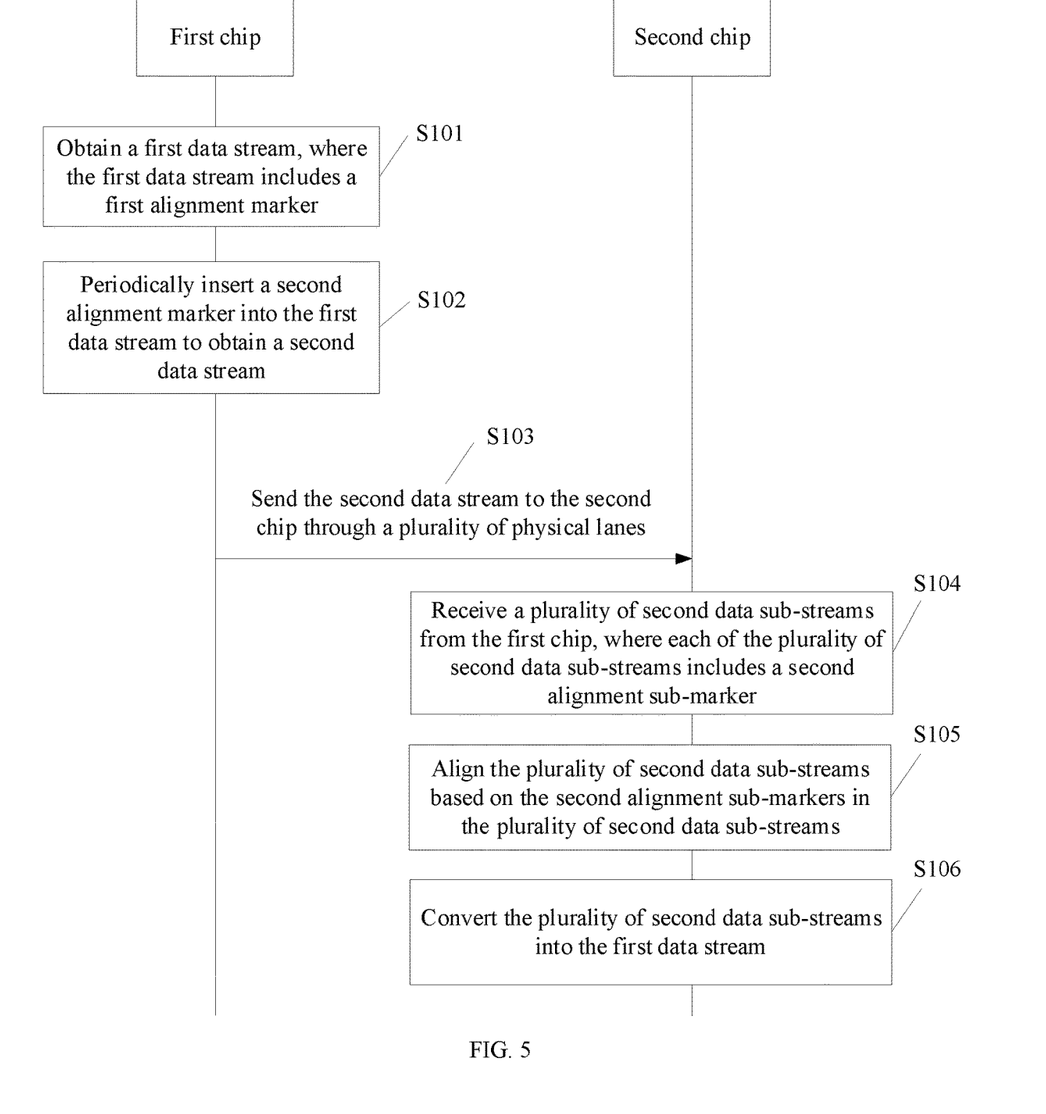
FIG. 5 is a flowchart of a data stream processing method according to an embodiment of this application.

FIG. 5 is a flowchart of a data stream processing method according to an embodiment of this application.

The following describes, with reference to FIG. 4 and FIG. 5, the data stream processing method provided in this embodiment of this application.

S101: A first chip obtains a first data stream, where the first data stream includes a first alignment marker.

In this embodiment of this application, for example, the first chip may be the chip 101 in the embodiment shown in FIG. 4. The first chip obtains the first data stream. A period of the first alignment marker included in the first data stream is $S*2^n$, that is, $2^n$ times of S, and a size of the first alignment marker is $L*2^n$, that is, $2^n$ times of L, where S and L are positive integers. The first data stream is a data stream obtained in a conventional manner. In this embodiment of this application, a quantity of a plurality of physical lanes is not equal to $2^n$, where n is a positive integer. Therefore, the first data stream cannot be restored at a receive end only by using the first alignment marker.

In addition, in this embodiment of this application, a quantity of physical lanes may alternatively be, for example, a quantity of SerDeses. For example, if a 400 Gigabit (400 G) interface of the first chip uses six pairs of SerDeses to transmit data, a quantity of physical lanes of the interface is six.

S102: The first chip periodically inserts a second alignment marker into the first data stream to obtain a second data stream.

In this embodiment of this application, the second alignment marker may be the same as or different from the first alignment marker. For details, refer to the following descriptions. If the second alignment marker is different from the first alignment marker, the second alignment marker needs to meet a condition that the second alignment marker can be identified from the second data stream and be distinguished from the first alignment marker.

S103: The first chip sends the second data stream to a second chip through a plurality of physical lanes.

To enable the receive end to restore the first data stream, in this embodiment of this application, the first chip periodically inserts the second alignment marker into the first data stream to obtain the second data stream.

An insertion period of the second alignment marker is an integer multiple of a quantity of the plurality of physical lanes. In addition, a size of each second alignment marker is also an integer multiple of the quantity of the plurality of physical lanes. In this embodiment of this application, the size of the second alignment marker is a quantity of data blocks included in the second alignment marker. The data blocks included in the second alignment marker can be evenly allocated to the plurality of physical lanes and are aligned.

For example, if a quantity of physical lanes is 12, and a period of the first alignment marker includes 16 data blocks, a period of the second alignment marker may include, for example, 48 data blocks, 96 data blocks, or 144 data blocks. If the period of the second alignment marker includes 48 data blocks, it indicates that one second alignment marker can be inserted at an interval of 48 data blocks. It should be noted that the 48 data blocks include the first alignment marker.

For another example, an insertion period of the second alignment marker may be obtained according to a common multiple of a period of the first alignment marker and a quantity of the plurality of physical lanes, a quantity of symbols with a size of 10 bits in a forward error correction (FEC) codeword in the first data stream, and a rate of the first data stream. For details, refer to the following formula: $T'=h*T*Z*x/N=h*T*Z/2^n$ T' is an insertion period of the second alignment marker, T is a period of the first alignment marker, and h and Z each are a coefficient, where h is a positive integer, and $Z=xy/z$. x is related to a quantity of physical lanes, and the quantity of physical lanes may be expressed as $N=x*2^n$. For example, if a quantity of physical lanes is 12, x may be 3. y is a coefficient, and a value of y is a positive integer. z is related to an interface type, and $z=j*l$, where l is a coefficient, and a value of l is a positive integer. j is a common divisor of a quantity of symbols with a size of 10 bits in a FEC codeword in the first data stream and a rate of the first data stream. For example, for RS(544,514) FEC code, 544 is a quantity of symbols with a size of 10 bits in a FEC codeword. If a rate of the first data stream is 4*106.25 Gigabits per second (Gbps), j=17. For example, for RS(528,514) FEC code, if a rate of the first data stream is 4*103.125 Gbps, j=33.

For example, the period of the first alignment marker T is as follows. In the first data stream, every 5440*4096 bits of data contain one first alignment marker. If the quantity of physical lanes is 12, the insertion period of the second alignment marker T' is as follows. Every 5440*4096*18/17*3 bits of data contain one second alignment marker.

In this embodiment of this application, the first chip may insert the second alignment marker in two possible implementations.

In one possible implementation, each second alignment marker includes a plurality of second alignment sub-markers, a quantity of the plurality of second alignment sub-markers is the quantity of physical lanes, and a size of each second alignment sub-marker is a ratio of the size of the second alignment marker to the quantity of the plurality of physical lanes. For example, a size of each second alignment marker is a quantity 12*12 of data blocks. If a quantity of physical lanes is 12, each second alignment marker may be considered to include 12 alignment sub-markers, and a size of each second alignment sub-marker is a quantity 12 of data blocks.

Correspondingly, S102 and S103 may be as follows. The first chip converts the first data stream into a plurality of first data sub-streams based on the quantity of the plurality of physical lanes, where each of the plurality of first data sub-streams corresponds to one physical lane. In this embodiment of this application, because the quantity of the plurality of physical lanes is not equal to $2^n$, first alignment markers in the plurality of first data sub-streams are not aligned. For example, the black blocks in FIG. 3 are not aligned. Therefore, to align the plurality of first data sub-streams, in this embodiment of this application, the first chip periodically inserts a second alignment sub-marker into each first data sub-stream to obtain a plurality of second data sub-streams. An insertion period of the second alignment sub-marker is a ratio of the insertion period of the second alignment marker to the quantity of the plurality of physical lanes.

After the first chip inserts the second alignment sub-marker into each first data sub-stream at a same period, second alignment sub-markers are aligned. Finally, the first chip sends the plurality of second data sub-streams through the plurality of physical lanes.

Figure 6:
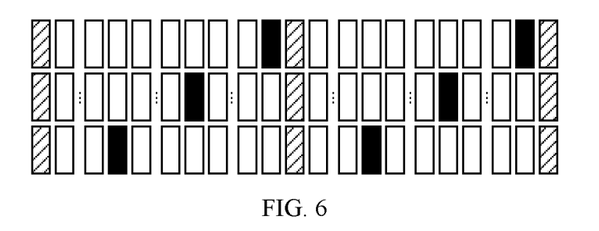
FIG. 6 is a schematic diagram of inserting a second alignment sub-marker into a second data sub-stream according to an embodiment of this application.

FIG. 6 is a schematic diagram of inserting a second alignment sub-marker into a second data sub-stream. A block filled with slashes represents a second alignment sub-marker. Locations of second alignment sub-markers in second data sub-streams are the same. In an example, the second alignment sub-markers are aligned in the second data sub-streams. In this way, after receiving the second data sub-streams, a receive end can restore a first data stream based on the second alignment sub-markers in the second data sub-streams.

In some embodiments of this application, an insertion location of the second alignment sub-marker may be determined based on a location of a first alignment sub-marker that is in a first data sub-stream and that forms a first alignment marker, or may not be related to a location of a first alignment sub-marker. If the insertion location of the second alignment sub-marker is determined based on the location of the first alignment sub-marker that is in the first data sub-stream and that forms the first alignment marker, the receive end may find the first alignment sub-marker based on a location relationship between the second alignment sub-marker and the first alignment sub-marker, and restore the first data stream based on the location of the first alignment sub-marker. In an example, the first chip determines the insertion location of the second alignment sub-marker based on the location of the first alignment sub-marker in the first data stream and a preset distance, and the first chip periodically inserts the second alignment sub-marker into the first data stream based on the insertion location of the second alignment sub-marker. If the insertion location of the second alignment sub-marker is not related to the location of the first alignment sub-marker, the receive end needs to detect the first alignment sub-marker, and then restores the first data stream based on the detected first alignment sub-marker. For details, refer to the following descriptions. The details are not described herein.

In the embodiment shown in FIG. 6, it is assumed that a data sub-stream in the first row is a data sub-stream A. A location relationship between a first alignment sub-marker and a second alignment sub-marker in the data sub-stream A is as follows. A next alignment sub-marker adjacent to the second alignment sub-marker is the first alignment sub-marker (it is assumed that a sequence of sending data blocks is from right to left), that is, a preset distance includes one data block. It is assumed that a data sub-stream in the second row is a data sub-stream B. A location relationship between a first alignment sub-marker and a second alignment sub-marker in the data sub-stream B is as follows. The $w^{th}$ data block after the second alignment sub-marker is the first alignment sub-marker, that is, a preset distance includes w data blocks. A value of w may be determined based on example situation. Details are not described herein.

In the other possible implementation, S102 and S103 may be as follows. After the first chip periodically inserts the second alignment marker into the first data stream to obtain the second data stream, the first chip converts the second data stream into the plurality of second data sub-streams, and then the first chip sends the second data sub-streams to the second chip through the plurality of physical lanes.

Figure 7:
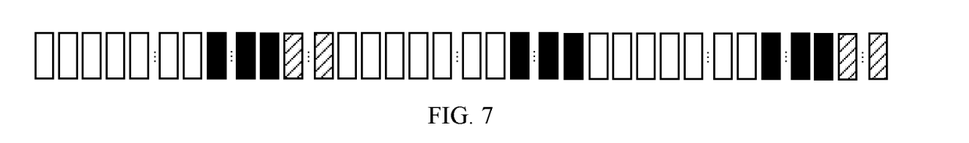
FIG. 7 is a schematic diagram of an insertion location of a second alignment marker and a location of a first alignment marker according to an embodiment of this application.

An insertion location of the second alignment marker may be related to or not related to an insertion location of the first alignment marker. If the insertion location of the second alignment marker is associated with the insertion location of the first alignment marker, the second chip may determine a location of the first alignment marker based on the insertion location of the second alignment marker. For example, refer to FIG. 7. The second alignment marker is followed by the first alignment marker (a flow direction of the data stream is from left to right). In this case, the insertion period of the second alignment marker is greater than or equal to a common multiple of an insertion period of the first alignment marker and the quantity of the plurality of physical lanes. If a rate of the second data stream is equal to a rate of the first data stream, the insertion period of the second alignment marker is equal to the common multiple of an insertion period of the first alignment marker and the quantity of the plurality of physical lanes; or if a rate of the second data stream is greater than a rate of the first data stream, the insertion period of the second alignment marker is greater than the common multiple of an insertion period of the first alignment marker and the quantity of the plurality of physical lanes.

It may be understood that the foregoing two implementations do not constitute a limitation on the technical solutions of this application, and persons skilled in the art may design an implementation based on example situation.

In this embodiment of this application, the second data stream may include or not include the first alignment marker. When the rate of the second data stream is equal to the rate of the first data stream, the second data stream does not include the first alignment marker. The first chip may delete the first alignment marker from the first data stream, and insert the second alignment marker to obtain the second data stream. That is, the first alignment marker is "replaced with" the second alignment marker. A product of the size of the second alignment marker and a period of the second alignment marker is equal to a product of a size of the first alignment marker and a period of the first alignment marker. For the receive end, if the second data stream does not include the first alignment marker, the receive end needs to restore the first alignment marker to obtain the first data stream.

In an example, the first chip may delete the first alignment marker in two manners. As one possible implementation, S102 may be as follows. The first chip may delete the first alignment marker from the first data stream to obtain a third data stream, and then the first chip periodically inserts the second alignment marker into the third data stream to obtain the second data stream. In the other possible implementation, S103 may be as follows. The first chip deletes the first alignment marker from the second data stream to obtain a fourth data stream, and then the first chip sends the fourth data stream through the plurality of physical lanes. In other words, in the former implementation, the first alignment marker is deleted and then the second alignment marker is inserted, but in the latter implementation, the second alignment marker is inserted and then the first alignment marker is deleted.

In addition, because a quantity of conventional physical lanes is $2^n$, when traffic (including the first alignment marker) of the first data stream per unit time that is obtained by the first chip is an integer multiple of $2^n$, the data stream can be evenly allocated to all the physical lanes. For example, traffic of the first data stream is 4*106.25 Gbps. When a quantity of physical lanes is 4, traffic corresponding to each physical lane is 106.25 Gbps. However, in embodiments of this application, a quantity of physical lanes is not $2^n$. Therefore, a ratio of the traffic of the first data stream per unit time to the quantity of physical lanes may be an integer or may not be an integer. For example, if traffic of the first data stream is 450 Gbps, and a quantity of physical lanes is 6, 450 Gbps can be exactly divided by 6. Therefore, the first data stream can be evenly allocated to the six physical lanes. If traffic of the first data stream is 4*106.25 Gbps, and a quantity of physical lanes is 12, 4*106.25 Gbps cannot be exactly divided by 12. Therefore, the first data stream cannot be evenly allocated to the 12 physical lanes.

If a ratio of the traffic of the first data stream per unit time to a quantity of physical lanes is not an integer, the data stream needs to be "extended", so that the traffic of the data stream per unit time can be exactly divided by the quantity of physical lanes.

In this embodiment of this application, a rate of the second data stream may be first determined. The rate of the second data stream needs to meet the following two conditions. The rate of the second data stream is greater than or equal to a rate of the first data stream, and traffic per unit time that corresponds to the rate of the second data stream is an integer multiple of the quantity of physical lanes.

For example, if a rate of the first data stream is 4*106.25 Gbps, and a quantity of physical lanes is 6, a rate of the second data stream may be 450 Gbps.

Optionally, in this embodiment of this application, the rate of the second data stream may be equal to a product of the rate of the first data stream and a coefficient Z, where Z=xy/z. x is related to a quantity of physical lanes, and the quantity of physical lanes may be expressed as $N=x*2^n$. For example, if a quantity of physical lanes is 12, x may be 3. y is a coefficient, and a value of y is a positive integer. z is related to an interface type, and z=j*l, where l is a coefficient, and a value of l is a positive integer. j is a common divisor of a quantity of symbols with a size of 10 bits in a FEC codeword in the first data stream and a rate of the first data stream.

In this embodiment of this application, in a possible implementation, a size and a period of the second alignment marker may be determined based on a ratio of the rate of the second data stream to the rate of the first data stream, so that a total rate of the data sub-stream distributed to each physical lane is the rate of the second data stream.

For example, it is assumed that the rate of the second data stream is 450 Gbps, and the rate of the first data stream is 4*106.25 Gbps. In this case, the ratio of the rate of the first data stream to the rate of the second data stream is 17/18.

In another possible implementation, in addition to inserting the second alignment marker into the first data stream, padding data may be further inserted into the first data stream. The padding data may be data that can be distinguished from service data in the first data stream, such as random data or pseudo-random data. A size of the padding data is determined based on the ratio of the rate of the second data stream to the rate of the first data stream and the size and the period of the second alignment marker.

For example, if there are 12 physical lanes and there are 8570880 data blocks between two second alignment markers, a corresponding first data stream has 80947200 data blocks, and a size of the second alignment marker is 96 data blocks, a size of padding data between the two second alignment markers may be 476064 data blocks.

In this embodiment of this application, the padding data may be periodically or randomly inserted into the first data stream per unit time. This is not limited in this application.

Figure 8:
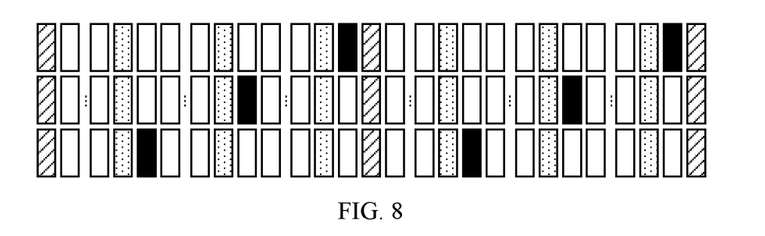
FIG. 8 is a schematic diagram of inserting padding data and a second alignment marker into a first data sub-stream according to an embodiment of this application.

In addition, the padding data may be first inserted into the first data stream, and then the first data stream is converted into a plurality of data sub-streams, or the first data stream may be first converted into a plurality of first data sub-streams, and then the padding data is inserted into the first data sub-streams. FIG. 8 is a schematic diagram of inserting padding data and a second alignment marker into a first data sub-stream according to an embodiment of this application. A block filled with black dots represents padding data.

When a rate of a second data stream is not equal to a rate of a first data stream, an insertion period of a second alignment marker is determined based on a product of a first value and a second value. The first value is a common multiple of an insertion period of a first alignment marker and a quantity of a plurality of physical lanes, and the second value is a ratio of the rate of the second data stream to the rate of the first data stream.

In addition, it should be noted that the second alignment marker and the padding data may be inserted before or after the second data stream is distributed to the physical lanes.

It should be further noted that a total rate of the data sub-stream distributed to each physical lane needs to be within a rate range supported by each data sub-stream in each physical lane. For example, assuming that rate ranges supported by the data sub-streams in the physical lanes are 45 Gbps to 55 Gbps and 70 Gbps to 80 Gbps, the total rate of the data sub-stream distributed to each physical lane needs to fall within one of the foregoing two ranges, but cannot fall within 55 Gbps to 70 Gbps. Therefore, a rate of the second data stream in the plurality of physical lanes needs to fall within a range of a product of the rate range supported by the data sub-stream in each physical lane and a quantity of physical lanes.

S104: The second chip receives the plurality of second data sub-streams from the first chip, where each of the plurality of second data sub-streams includes a second alignment sub-marker.

As a receive end of the second data sub-stream, the second chip may be, for example, the chip 102 in the embodiment shown in FIG. 4.

S105: The second chip aligns the plurality of second data sub-streams based on the second alignment sub-markers in the plurality of second data sub-streams.

Because the second alignment sub-markers are aligned when the second data sub-streams are sent, after receiving the second data sub-streams, the second chip may align the second data sub-streams based on the second alignment sub-markers, so that receiving time points at which the second chip receives the second data sub-streams are the same.

S106: The second chip converts the plurality of second data sub-streams into the first data stream.

In this embodiment of this application, the second chip may delete the second alignment sub-markers from the plurality of second data sub-streams, and then restore the first data stream. Alternatively, the second chip may combine the plurality of second data sub-streams into one data stream, and then delete a second alignment marker from the data stream, to obtain the first data stream.

In an example, in a possible implementation, S106 is as follows. First, the second chip deletes the second alignment sub-markers from the plurality of second data sub-streams to obtain the first data sub-streams. Then, the second chip combines the first data sub-streams into the first data stream.

In another possible implementation, S106 is as follows. First, the second chip combines the plurality of second data sub-streams into the second data stream, and combines the second alignment sub-markers in the plurality of second data sub-streams into a second alignment marker. Then, the second chip deletes the second alignment marker from the second data stream to obtain the first data stream.

If the second data sub-stream further includes padding data, the second chip needs to delete the padding data. In an example, if a location of the padding data is not associated with a location of the second alignment marker, the second chip may find the padding data based on a feature of the padding data, and delete the padding data. If a location of the padding data is associated with a location of the second alignment marker, for example, if the location of the padding data in the second data sub-stream and the location of the second alignment marker in the data sub-stream meet a first preset location relationship, the second chip may first find the second alignment marker, then find the location of the padding data based on the first preset location relationship and the location of the second alignment marker, and delete the padding data based on the location of the padding data.

A moment at which the second chip deletes the padding data is similar to a moment at which the second chip deletes the second alignment sub-markers or the second alignment marker.

In a possible implementation, when the second data sub-stream further includes padding data, that the second chip converts the plurality of second data sub-streams into the first data stream further includes the second chip deletes the padding data from the plurality of second data sub-streams to obtain first data sub-streams, and the second chip combines the first data sub-streams into the first data stream.

If a location of the second alignment sub-marker is associated with a location of the padding data, the second chip deletes the padding data from the plurality of second data sub-streams based on locations of the second alignment sub-markers and a first preset location relationship. The first preset location relationship is a location relationship between the second alignment sub-marker and the padding data.

In another possible implementation, when the second data sub-stream further includes padding data, that the second chip converts the plurality of second data sub-streams into the first data stream further includes the second chip combines the plurality of second data sub-streams into the second data stream, and the second chip deletes the padding data from the second data stream to obtain the first data stream.

If a location of the second alignment marker is associated with a location of the padding data, the second chip deletes the padding data from the plurality of second data streams based on the location of the second alignment marker and a second preset location relationship. The second preset location relationship is a location relationship between the second alignment marker and the padding data.

As mentioned above, if the second data sub-stream includes the first alignment marker, when the first chip inserts the second alignment marker, the second alignment marker needs to be distinguished from the first alignment marker. In an example, the second alignment marker is different from the first alignment marker, so that the second chip can identify the second alignment marker and further delete the second alignment marker. If the location of the second alignment marker is associated with the location of the first alignment marker, the second chip can identify the location of the first alignment marker based on the location of the second alignment marker.

If the second data sub-stream does not include the first alignment marker, the second chip can insert the first alignment marker into the second data sub-stream, to restore the first data stream. In this case, the second alignment marker may be the same as the first alignment marker.

If the second chip first deletes the second alignment sub-markers, and then obtains the converted first data stream, correspondingly, the second chip may alternatively first insert the first alignment marker and then obtain the merged second data stream. In an example, the second chip deletes the second alignment sub-markers from the plurality of second data sub-streams, and inserts first alignment sub-markers into the second data sub-streams based on locations of the second alignment sub-markers and a third preset location relationship, to obtain the first data sub-streams. The third preset location relationship is a relationship between an insertion location of the first alignment sub-marker and a location of the second alignment sub-marker.

If the second chip first obtains the merged second data stream and then deletes the second alignment marker, correspondingly, the second chip may alternatively first obtain the merged second data stream and then inserts the first alignment marker. In an example, the second chip deletes the second alignment marker from the second data stream, and inserts the first alignment marker into the second data stream based on a location of the second alignment marker and a fourth preset location relationship, to obtain the first data stream. The fourth preset location relationship is a relationship between an insertion location of the first alignment marker and a location of the second alignment marker.

In actual application, the second chip may first insert the first alignment marker, and then delete the second alignment marker, or may first delete the second alignment marker, and then insert the first alignment marker.

If the second chip first deletes the second alignment marker, and then inserts the first alignment marker, the second chip needs to insert a marker at a location of the second alignment marker after deleting the second alignment marker, where the marker is used to indicate that the location is a location of the second alignment marker. When the first alignment marker is inserted, the first alignment marker may be inserted based on the marker and the fourth preset location relationship.

In conclusion, in this embodiment of this application, the first chip inserts the second alignment marker into the first data stream to obtain the second data stream, and sends the second data stream through the plurality of physical lanes whose quantity is not equal to 2n. Because the insertion period and the size of the second alignment marker each are an integer multiple of the quantity of the physical lanes, the second alignment sub-markers in the second data sub-streams corresponding to the physical lanes are aligned. In this way, the second chip can align the received second data sub-streams based on the second alignment marker, to restore the first data stream based on the aligned second data sub-streams. Therefore, the quantity of the physical lanes is not limited to 2n while ensuring that the insertion period and the size of the first alignment marker are not modified, so that transmission flexibility of the data stream is improved.

Figure 9:
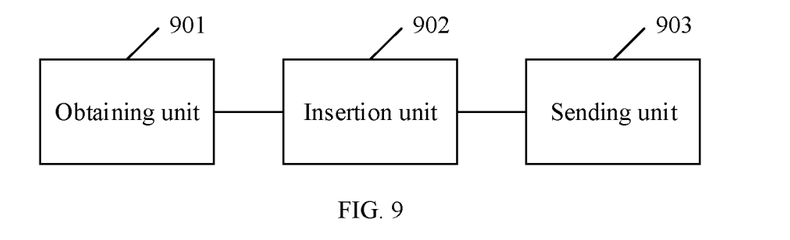
FIG. 9 is a block diagram of a structure of a data stream processing apparatus according to an embodiment of this application.

Correspondingly, refer to FIG. 9. An embodiment of this application further provides a data stream processing apparatus 900. The apparatus 900 is applied to a first chip, and the first chip may implement functions of the first chip in the embodiment shown in FIG. 5.

The data stream processing apparatus 900 includes an obtaining unit 901, an insertion unit 902, and a sending unit 903. The obtaining unit 901 is configured to obtain a first data stream, where the first data stream includes a first alignment marker.

The insertion unit 902 is configured to periodically insert a second alignment marker into the first data stream to obtain a second data stream.

The sending unit 903 is configured to send the second data stream through a plurality of physical lanes, where a quantity of the plurality of physical lanes is not equal to 2n, and n is a positive integer; an insertion period of the second alignment marker and a size of each second alignment marker are determined based on a first condition or a second condition, the first condition is the quantity of the plurality of physical lanes, the second condition is the quantity of the plurality of physical lanes and a ratio of a rate of the second data stream to a rate of the first data stream, and the insertion period of the second alignment marker and the size of each second alignment marker each are an integer multiple of the quantity of the plurality of physical lanes; and the rate of the second data stream is greater than or equal to the rate of the first data stream, and traffic per unit time that corresponds to the rate of the second data stream is an integer multiple of the quantity of physical lanes.

For related descriptions of the data stream processing apparatus 900, refer to the descriptions of the first chip in the embodiment shown in FIG. 5. Details are not described herein again.

Figure 10:
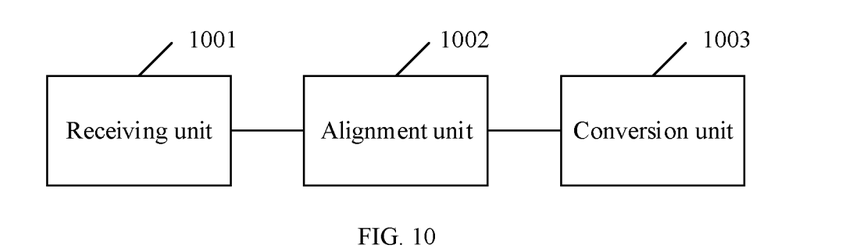
FIG. 10 is a block diagram of a structure of another data stream processing apparatus according to an embodiment of this application.

Refer to FIG. 10. An embodiment of this application provides a data stream processing apparatus 1000. The apparatus 1000 is applied to a second chip, and the second chip may implement functions of the second chip in the embodiment shown in FIG. 5.

The data stream processing apparatus 1000 includes a receiving unit 1001, an alignment unit 1002, and a conversion unit 1003. The receiving unit 1001 is configured to receive a plurality of second data sub-streams, where each of the plurality of second data sub-streams includes a second alignment sub-marker.

The alignment unit 1002 is configured to align the plurality of second data sub-streams based on the second alignment sub-markers in the plurality of second data sub-streams.

The conversion unit 1003 is configured to convert the plurality of second data sub-streams into a first data stream, where the first data stream does not include the second alignment sub-markers.

For related descriptions of the data stream processing apparatus 1000, refer to the descriptions of the second chip in the embodiment shown in FIG. 5. Details are not described herein again.

Correspondingly, an embodiment of this application further provides a data stream processing device corresponding to the data stream processing apparatus 900 and a data stream processing device corresponding to the data stream processing apparatus 1000. The foregoing devices each include a processor and a memory. The memory is configured to store instructions. The processor is configured to execute the instructions in the memory, and perform the data stream processing method that is performed by the first chip and the second chip and that is provided in the foregoing method embodiment.

Figure 11:
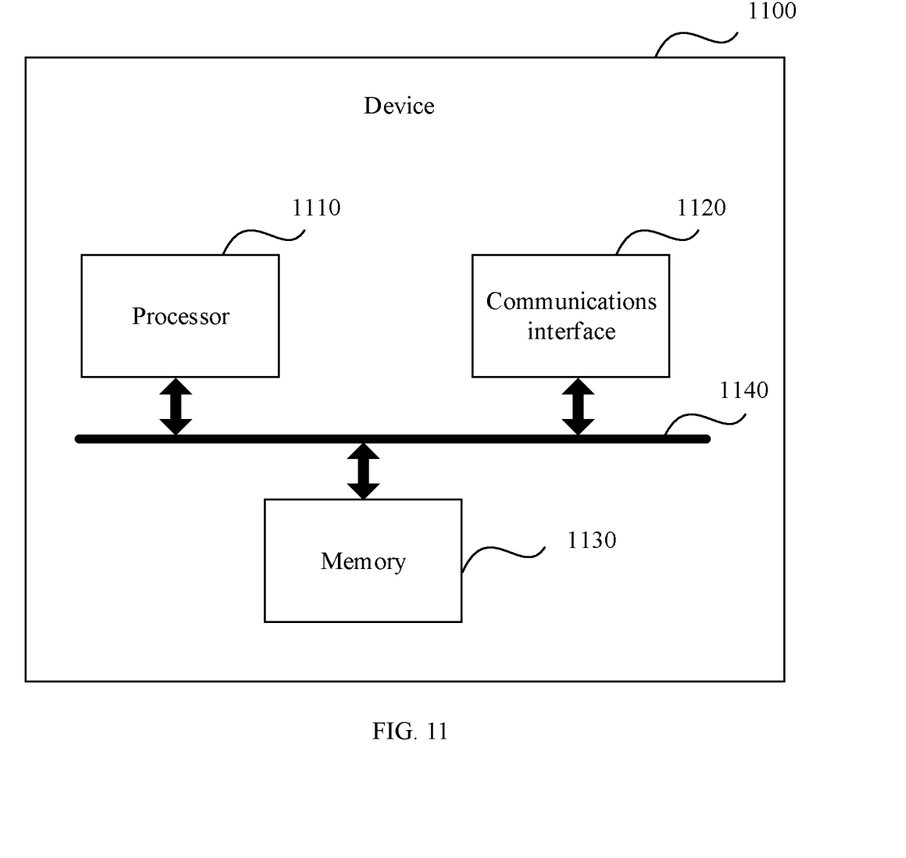
FIG. 11 is a schematic diagram of a data stream processing device according to an embodiment of this application.

It should be noted that hardware structures of the data stream processing device corresponding to the data stream processing apparatus 900 and the data stream processing device corresponding to the data stream processing apparatus 1000 each may be a structure shown in FIG. 11. FIG. 11 is a schematic diagram of a structure of a data stream processing device according to an embodiment of this application.

Refer to FIG. 11. The device 1100 includes a processor 1110, a communications interface 1120, and a memory 1130. The device 1100 may include one or more processors 1110. In FIG. 11, one processor is used as an example. In this embodiment of this application, the processor 1110, the communications interface 1120, and the memory 1130 may be connected through a bus system or in another manner. In FIG. 11, for example, a bus system 1140 is used for connection.

The processor 1110 may be a CPU, a network processor (NP), or a combination of a CPU and an NP. The processor 1110 may further include a hardware chip. The hardware chip may be an ASIC, a PLD, or a combination thereof. The PLD may be a complex programmable logic device (CPLD), a FPGA, a generic array logic (GAL), or any combination thereof.

The memory 1130 may include a volatile memory, for example, a random-access memory (RAM). Alternatively, the memory 1130 may include a non-volatile memory, for example, a flash memory, a hard disk drive (HDD), or a solid-state drive (SSD). Alternatively, the memory 1130 may include a combination of the foregoing types of memories.

Optionally, the memory 1130 stores an operating system and a program, an executable module, or a data structure, or a subset thereof, or an extended set thereof. The program may include various operation instructions, used to implement various operations. The operating system may include various system programs, to implement various basic services and process a hardware-based task. The processor 1110 may read a program in the memory 1130, to implement the data stream processing method provided in embodiments of this application.

The bus system 1140 may be a peripheral component interconnect (PCI) bus, an Extended Industry Standard Architecture (EISA) bus, or the like. The bus system 1140 may be classified into an address bus, a data bus, a control bus, and the like. For ease of representation, only one thick line is used to represent the bus in FIG. 11, but this does not mean that there is only one bus or only one type of bus.

An embodiment of this application provides a computer-readable storage medium, including a computer program. When the computer program is run on a computer, the computer is enabled to perform the foregoing data stream processing method.

An embodiment of this application provides a network device, including the foregoing data stream processing apparatus applied to the first chip and the foregoing data stream processing apparatus applied to the second chip.

In the specification, claims, and accompanying drawings of this application, the terms "first", "second", "third", "fourth", and so on (if available) are intended to distinguish between similar objects but do not necessarily indicate a specific order or sequence. It should be understood that the data termed in such a way is interchangeable in proper circumstances so that the embodiments of the present disclosure described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed systems, apparatuses, and methods may be implemented in other manners. For example, the described apparatus embodiments are merely examples. For example, division into the units is merely logical module division. In an actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be obtained depending on an actual requirement to implement the objectives of the solutions in the embodiments.

In addition, module units in the embodiments of this application may be integrated into one processing unit. Alternatively, each of the units may exist alone physically, or at least two units are integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a Universal Serial Bus (USB) flash drive, a removable hard disk, a read-only memory (ROM), a RAM, a magnetic disk, or an optical disc.

Persons skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible to a general-purpose or dedicated computer.

In the foregoing implementations, the objectives, technical solutions, and beneficial effects of the present disclosure are further described in detail. It should be understood that the foregoing descriptions are merely implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:
    obtaining, by a first chip, a first data stream, wherein the first data stream comprises a first alignment marker;
    periodically inserting, by the first chip, a second alignment marker into the first data stream to obtain a second data stream; and
    sending, by the first chip, the second data stream through a plurality of physical lanes, wherein a quantity of the physical lanes is not limited to $2^n$, wherein n is a positive integer, wherein a first insertion period of each second alignment marker and a size of the each second alignment marker are based on one or more of a first condition and a second condition, wherein the first condition is the quantity of the physical lanes, wherein the second condition is the quantity of the physical lanes and a ratio of a second rate of the second data stream to a first rate of the first data stream, wherein the first insertion period and the size of the each second alignment marker is an integer multiple of the quantity of the physical lanes, wherein the second rate is greater than or equal to the first rate, and wherein traffic per unit time that corresponds to the second rate is an integer multiple of the quantity of the physical lanes.

2. The method of claim 1, wherein the second alignment marker comprises a plurality of second alignment sub-markers, wherein a quantity of the second alignment sub-markers is the quantity of the physical lanes, wherein a size of each second alignment sub-marker is a quantity m of data blocks, wherein m is a ratio of the size of the second alignment marker to the quantity of the physical lanes, and wherein m is a positive integer, wherein the periodically inserting comprises:
  converting, by the first chip, the first data stream into a plurality of first data sub-streams based on the quantity of the physical lanes, wherein each of the first data sub-streams corresponds to one physical lane; and
  further periodically inserting, by the first chip, a second alignment sub-marker into each first data sub-stream to obtain a plurality of second data sub-streams, and
  wherein the sending comprises further sending, by the first chip, the second data sub-streams through the physical lanes.

3. The method of claim 1, further comprising determining, by the first chip, an insertion location of the second alignment marker based on a location of the first alignment marker in the first data stream and a preset distance, wherein the periodically inserting further comprises further periodically inserting, by the first chip, the second alignment marker into the first data stream based on the insertion location of the second alignment marker, and wherein the first insertion period is greater than or equal to a common multiple of a second insertion period and the quantity of the physical lanes.

4. The method of claim 1, wherein when the second rate is greater than the first rate, the method further comprises inserting, by the first chip, padding data into the first data stream.

5. The method of claim 4, wherein the inserting further comprises periodically inserting, by the first chip, the padding data into the first data stream.

6. The method of claim 4, wherein the padding data is a random sequence.

7. The method of claim 1, wherein when the second rate is equal to the first rate, the periodically inserting further comprises:
  deleting, by the first chip, the first alignment marker from the first data stream to obtain a third data stream; and
  further periodically inserting, by the first chip, the second alignment marker into the third data stream to obtain the second data stream, wherein a product of the size of the second alignment marker and a period of the second alignment marker is equal to a product of a size of the first alignment marker and a period of the first alignment marker.

8. The method of claim 1, wherein when the second rate is equal to the first rate, the sending comprises:
  deleting, by the first chip, the first alignment marker from the second data stream to obtain a fourth data stream; and
  further sending, by the first chip, the fourth data stream through the physical lanes, wherein a product of the size of the second alignment marker and a period of the second alignment marker is equal to a product of a size of the first alignment marker and a period of the first alignment marker.

9. An apparatus comprising:
  a processor; and
  a non-transitory storage medium in communication with the processor and configured to store program instructions that when executed by the processor cause the apparatus to be configured to:
    obtain a first data stream, wherein the first data stream comprises a first alignment marker;
    periodically insert a second alignment marker into the first data stream to obtain a second data stream; and
    send the second data stream through a plurality of physical lanes, wherein a quantity of the physical lanes is not limited to $2^n$, wherein n is a positive integer, wherein a first insertion period of each second alignment marker and a size of the each second alignment marker are based on one or more of a first condition and a second condition, wherein the first condition is the quantity of the physical lanes, wherein the second condition is the quantity of the physical lanes and a ratio of a second rate of the second data stream to a first rate of the first data stream, wherein the first insertion period and the size of the each second alignment marker are an integer multiple of the quantity of the physical lanes, wherein the second rate is greater than or equal to the first rate, and wherein traffic per unit time that corresponds to the second rate of the second data stream is an integer multiple of the quantity of the physical lanes.

10. The apparatus of claim 9, wherein the second alignment marker comprises a plurality of second alignment sub-markers, wherein a quantity of the second alignment sub-markers is the quantity of the physical lanes, wherein a size of each second alignment sub-marker is a quantity m of data blocks, wherein m is a ratio of the size of the second alignment marker to the quantity of the physical lanes, wherein m is a positive integer, and wherein the program instructions further cause the apparatus to be configured to:
  convert the first data stream into a plurality of first data sub-streams based on the quantity of the physical lanes, wherein each of the first data sub-streams corresponds to one physical lane;
  periodically insert a second alignment sub-marker into each first data sub-stream to obtain a plurality of second data sub-streams; and
  send the second data sub-streams through the physical lanes.

11. The apparatus of claim 9, wherein the program instructions further cause the apparatus to be configured to:
  determine an insertion location of the second alignment marker based on a location of the first alignment marker in the first data stream and a preset distance; and
  periodically insert the second alignment marker into the first data stream based on the insertion location of the second alignment marker, wherein the first insertion period is greater than or equal to a common multiple of a second insertion period of the first alignment marker and the quantity of the physical lanes.

* * * * *